(No Model.)
M. G. COLLINS.
FLAMELESS LAMP.
No. 277,682. Patented May 15, 1883.
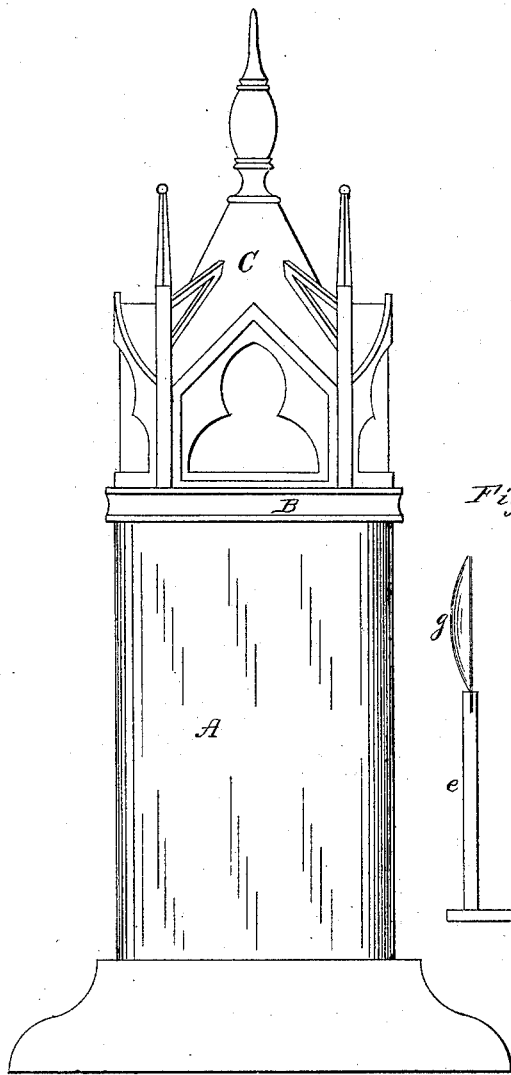
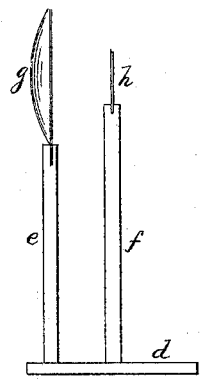
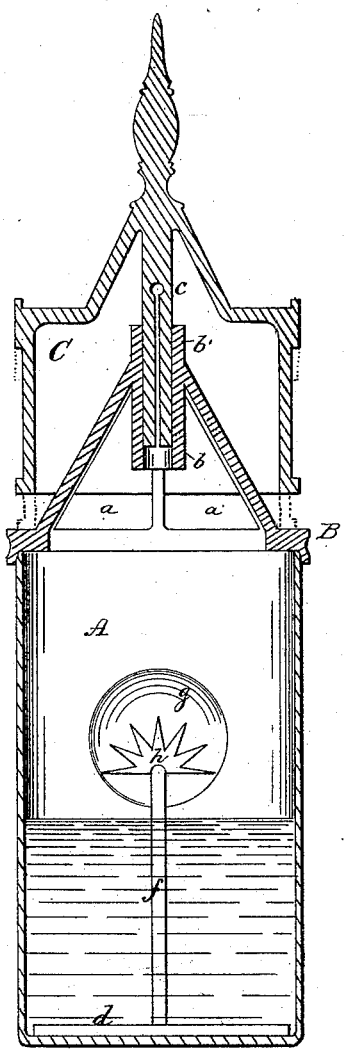
Witnesses:—
John F. Maloney,
Thomas J. Maloney
Inventor:
M. Grier Collins
by Connolly & McTighe
Attorneys.

UNITED STATES PATENT OFFICE.

M. GRIER COLLINS, OF COLUMBUS, OHIO, ASSIGNOR OF ONE-HALF TO JOHN W. LILLEY AND F. SIEGEL, JR., OF SAME PLACE.

FLAMELESS LAMP.

SPECIFICATION forming part of Letters Patent No. 277,682, dated May 15, 1883.

Application filed February 6, 1882. (No model.)

*To all whom it may concern:*

Be it known that I, M. GRIER COLLINS, of Columbus, in the county of Franklin and State of Ohio, have invented certain new and useful Improvements in Flameless Lamps; and I do hereby declare that the following is a full, clear, and exact description of the invention, which will enable others skilled in the art to which it appertains to make and use the same, reference being had to the accompanying drawings, which form a part of this specification, in which—

Figure 1 is a front elevation of one form of the lamp. Fig. 2 is a vertical section of the same; and Fig. 3 is a side or edge view of the burner, reflector, and support.

This invention relates to an apparatus for utilizing the phenomena of what is generally termed the "hydrogen" or "flameless" lamp for the purpose of producing a flashing light by incandescence, and for medical and perfuming purposes incidentally.

The invention consists, first, in the application to such a lamp of a burner or metal plate composed of an alloy of gold and copper electroplated with platinum; secondly, to the form of the burner; and, finally, to the combination, with the liquid-containing vessel, of a double adjustable cover.

More fully, my invention is as follows: I take a glass vessel, A, of any desired form or configuration, open at the top, and having its outer surface rendered semi-transparent by grinding, sand-blast, or acid. On top of the vessel A is a cover, B, fitting substantially air-tight thereon, but having one or more openings, $a$, as shown. Cover B has a central guide-tube, $b$. A second solid closed cover, C, is adapted to close down in a substantially air-tight manner upon cover B, and thereby entirely exclude the atmosphere from the vessel A. Cover C has a split rod, $c$, depending from its top inside, and adapted to fit and slide in the tube $b$ of cover B, with sufficient firmness, however, to remain at any position to which it may be set. This renders cover C adjustable to close the vessel A or adjust the light to any required condition. I set a plate, $d$, in the bottom of vessel A, and to said plate are attached two posts, $e$ and $f$, split at their tops. In post $e$, I set a reflector, $g$, and in post $f$, I set the burner $h$, which in this case is shown as the segment of a star, having its broadest part lowermost and its surface diminishing as it goes upwardly. The object of this is to avoid a too extensive surface for proper incandescence, while permitting the oxygen from above to cool the points rapidly, while the base remains hot enough to effect an active relighting. Any form of burner broad at the base and reduced in section as it goes upwardly may be used with similar effect.

The burner $h$, I make by taking a stiff alloy of copper and gold, rolling it out between polished rolls till reduced to about one two-thousandth of an inch, after which the plate is burnished. Then I electroplate it with platinum, either before or after shaping the burner, until it has reached a thickness of about one twelve-hundredth inch. The burner may then be used directly after the electroplating process—that is, without further treatment—or the electroplated surface may be burnished or polished before using the burner, if desired. The alloy gives stiffness and indestructibility under ordinary heat, while the electroplating insures purity of the platinum, as by such process only the pure metal is deposited, and thereby prevents the carbonization which would otherwise result from the use of oils in the fluid adopted. This fluid I prefer to make by compounding an emulsion of olive-oil and acohol or cologne spirits, to which may be added odoriferous oils or extracts for such purposes as incense in churches, perfumes in apartments and sick-chambers, or evaporative extracts or oils for medical purposes by inhalation.

The operation of my invention is as follows: The top C having been removed from the lamp, the vessel A is filled up to within a short distance of the burner with the burning-fluid. A light is then applied to the latter, causing it to ignite, and thereby heat the burner $g$. After said burner has become sufficiently heated the top C is replaced and the flame extinguished by the exclusion of oxygen. After the flame has been extinguished the top C is raised and an amount of oxygen admitted proportionate to the amount of light desired. The burner $g$ retains some of the heat imparted to it by the flame, and when the top is raised, as described, this heat causes an evaporation of the fluid in the vessel A, and the gases generated by such evaporation cause the burner to become incandescent and show through the transparent sides of the vessel A. As the air in the upper part of vessel A becomes vitiated and deprived of its oxygen by the combustion the light becomes dim, brightening again by the admission of fresh air. The light is of course by incandesence, is intermittent in flashes, and the form of the burner causes it to fairly imitate the light of a setting sun.

The vessel A may be made of colored glass for ornamental purposes.

I claim as my invention—

1. In a hydrogen or flameless lamp, a burner of copper alloyed with gold and electroplated with platinum, substantially as described.

2. In a hydrogen or flameless lamp, an incandescing burner having its broadest portion nearest the liquid and decreasing in area upwardly, substantially as described.

3. In a flameless lamp, the combination, with the vessel A, of the imperforate cover B, having guide-tube b, and closed cover C, having split rod c, substantially as described.

In testimony that I claim the foregoing as my own I have hereto affixed my signature in presence of two witnesses.

M. GRIER COLLINS.

Witnesses:
THOMAS J. PATTERSON,
THOS. J. MCTIGHE.